(12) United States Patent
Hoshi

(10) Patent No.: US 6,401,450 B1
(45) Date of Patent: Jun. 11, 2002

(54) CATALYST DETERIORATION DETECTOR AND METHOD OF DETECTING DETERIORATION OF CATALYST

(75) Inventor: Koichi Hoshi, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/357,920

(22) Filed: Jul. 21, 1999

(30) Foreign Application Priority Data

Aug. 19, 1998 (JP) .......................... 10-232875

(51) Int. Cl.⁷ .............................. F01N 3/00
(52) U.S. Cl. .................. 60/277; 60/274; 60/286; 60/284; 73/118.1
(58) Field of Search .............. 60/274, 277, 286, 60/300, 284, 307; 73/118.1

(56) References Cited

U.S. PATENT DOCUMENTS

| | | | | |
|---|---|---|---|---|
| 5,261,230 A | * | 11/1993 | Yuuki et al. ............ | 60/277 |
| 5,271,906 A | * | 12/1993 | Yuuki et al. ............ | 60/286 |
| 5,315,824 A | * | 5/1994 | Takeshima ............ | 60/297 |
| 5,379,586 A | * | 1/1995 | Honji et al. ............ | 60/297 |
| 5,499,501 A | * | 3/1996 | Kato et al. ............ | 60/286 |
| 5,591,905 A | * | 1/1997 | Fuhimoto et al. ............ | 60/277 |
| 5,626,014 A | * | 5/1997 | Hepburn et al. ............ | 60/277 |
| 5,634,331 A | * | 6/1997 | Aoki et al. ............ | 60/300 |
| 5,647,203 A | * | 7/1997 | Abe et al. ............ | 60/297 |
| 5,713,198 A | * | 2/1998 | Aoki et al. ............ | 60/277 |
| 5,738,832 A | * | 4/1998 | Dogahara et al. ............ | 60/297 |
| 5,857,163 A | * | 1/1999 | Trombley et al. ............ | 60/277 |
| 5,979,157 A | * | 11/1999 | Kinugasa et al. ............ | 60/307 |
| 5,987,977 A | * | 11/1999 | Hanafusa et al. ............ | 73/118.1 |
| 6,082,101 A | * | 7/2000 | Manaka et al. ............ | 60/277 |
| 6,145,304 A | * | 11/2000 | Takahashi et al. ............ | 60/297 |

FOREIGN PATENT DOCUMENTS

| | | | |
|---|---|---|---|
| JP | 62-61919 | | 4/1987 |
| JP | 2-67017 | | 5/1990 |
| JP | 8-270438 | | 10/1996 |
| JP | 40270440 A | * | 10/1996 |
| JP | 408270439 A | * | 10/1996 |
| JP | 9-32535 | | 2/1997 |
| JP | 9-228824 | | 9/1997 |

\* cited by examiner

Primary Examiner—Thomas Denion
Assistant Examiner—Thai-Ba Trieu
(74) Attorney, Agent, or Firm—Oliff & Berridge, PLC

(57) ABSTRACT

A catalyst deterioration detector detects the deterioration of a catalytic device that is disposed in an exhaust passage of an internal combustion engine, adsorbs hydrocarbons and oxidizes the hydrocarbons at a temperature equal to or higher than an activation temperature thereof. The catalyst deterioration detector includes an adsorption detector that detects a degree of adsorption of hydrocarbons by the catalytic device and a controller that determines deterioration of the catalytic device according to the degree of adsorption of hydrocarbons by the catalytic device as detected by the adsorption detector.

12 Claims, 7 Drawing Sheets

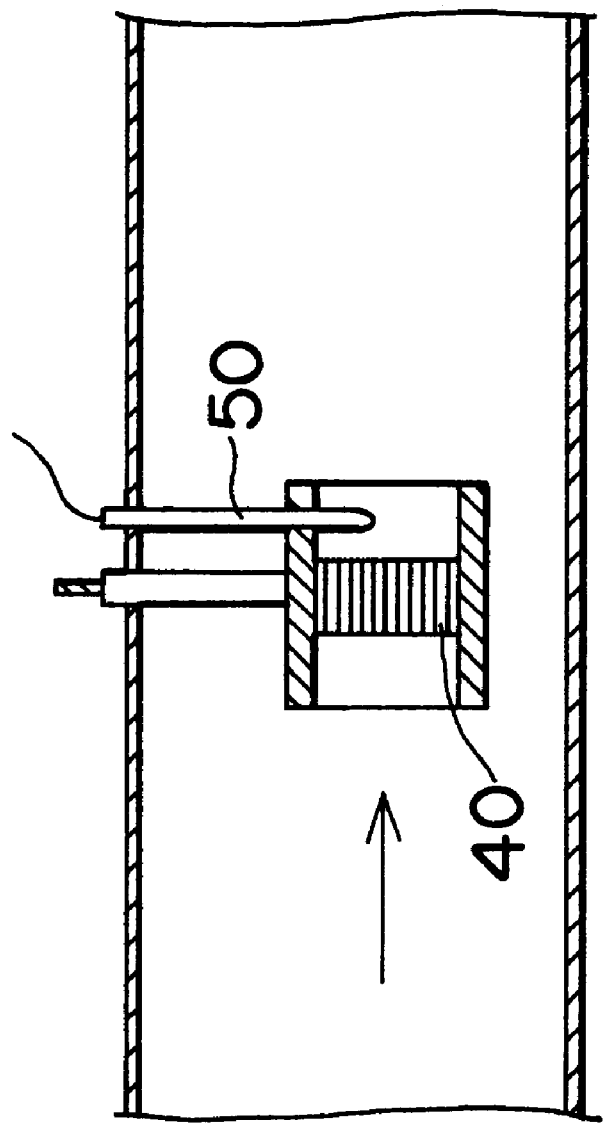

CATALYST DETERIORATION DETECTOR AND METHOD OF DETECTING DETERIORATION OF CATALYST

INCORPORATION BY REFERENCE

The disclosure of Japanese Patent Application No. HEI 10-232875 filed on Aug. 19, 1998 including the specification, drawings and abstract is incorporated herein by reference in its entirety.

BACKGROUND OF THE INVENTION

1. Field of Invention

The present invention relates to a catalyst deterioration detector that detects the deterioration of a catalytic device for purifying noxious substances contained in exhaust gas in an internal combustion engine. The present invention also relates to a method of detecting the deterioration of a catalytic device.

2. Description of Related Art

Exhaust gas discharged from an internal combustion engine such as a gasoline engine contains noxious substances (exhaust emission substances) including hydrocarbon (HC), carbon monoxide (CO) and nitrogen oxide (NOx). In order to purify these noxious substances by oxidation or reduction, catalytic devices are disposed in an exhaust passage through which the exhaust gas flows. As a result of deterioration in quality, these catalytic devices reduce their capacities to purify the noxious substances. Therefore, various measures have been taken to detect deterioration of the catalytic devices. For example, Japanese Laid-Open Patent Application No. HEI 9-32535 discloses an exemplary catalyst deterioration detector.

Due to the improved understanding and enforcement of environmental protection in recent years, it has been required to further reduce concentrations of exhaust emission substances. For this reason, the present inventors have been focusing attention on the adsorbing function of catalysts, as well as the oxidizing and reducing functions that are intrinsically attributed to catalysts, in order to further reduce concentrations of exhaust emission substances. Accordingly, there is a need for a detector capable of detecting deterioration in the adsorbing function of catalysts. However, known detectors such as the deterioration detector disclosed in Japanese Laid-Open Patent Application No. HEI 9-32535 are mainly intended to detect deterioration in the oxidizing and reducing functions of catalysts, and not to detect deterioration in the adsorbing function.

SUMMARY OF THE INVENTION

It is an object of the present invention to provide a catalyst deterioration detector that detects the deterioration of a catalytic device, particularly deterioration in the adsorbing function of the catalytic device.

An aspect of the present invention provides a catalyst deterioration detector for use with a first catalytic device that is disposed in an exhaust passage of an internal combustion engine. The first catalytic device includes a first catalyst and adsorbs hydrocarbons and oxidizes the hydrocarbons at a temperature equal to or higher than an activation temperature of the first catalytic device. The catalyst deterioration detector comprises an adsorption detector that detects a degree of adsorption of hydrocarbons by the first catalytic device, and a controller that determines the deterioration of the catalytic device according to the degree of adsorption detected by the adsorption detector.

In this aspect of the invention, the degree of adsorption of hydrocarbons by the first catalytic device is detected. If the detected degree of adsorption is smaller than a certain level, the controller determines that the adsorbing function of the first catalytic device has deteriorated. As a result, it is possible to precisely detect deterioration in adsorbing function of the first catalytic device.

Furthermore, in certain embodiments of the present invention, the adsorption detector can be disposed in the exhaust passage downstream of the first catalytic device. In such embodiments, the adsorption detector can be a detector that detects an amount of hydrocarbon discharged from the first catalytic device. Thereby, it is possible to determine a degree of adsorption of hydrocarbons by the first catalytic device by detecting an amount of hydrocarbons downstream of the first catalytic device. Such embodiments utilize the fact that when the degree of adsorption of hydrocarbons by the first catalytic device is at a low level, the amount of hydrocarbons that flows out toward the downstream side of the first catalytic device increases. Thus, there is no need to directly detect an amount of hydrocarbons adsorbed by the first catalytic device, and the degree of hydrocarbon adsorption of the first catalytic device can be detected using exhaust gas downstream of the first catalytic device. Therefore, the degree of adsorption can be determined easily.

Furthermore, the hydrocarbon detector can include a detection-oriented, second catalytic device that includes a second catalyst and oxidizes hydrocarbons, and a temperature detector that detects a temperature of the second catalytic device. In such embodiments, the hydrocarbons that flow out toward the downstream side of the first catalytic device are oxidized using the second catalytic device, and the temperature detector detects a change in temperature resulting from oxidation heat generated during this oxidation. In this manner, the degree of adsorption of the hydrocarbons can be detected. The hydrocarbon detector can comprise a second catalytic device and a temperature detector, such as a temperature sensor. The hydrocarbon detector can easily be mounted in the exhaust passage. Furthermore, it is possible not only to detect deterioration in the adsorbing function of the first catalytic device, but also to purify exhaust gas by oxidation of hydrocarbons by the second catalytic device.

Furthermore, the second catalytic device can be a heat-up type catalytic device, that is electrically activated to generate heat or to heat up. Thereby, the second catalytic device can be heated up and brought to its activation temperature at an early stage of engine operation. Thus, it is possible to detect more precisely a degree of deterioration in the adsorbing function of the first catalytic device. Also, because the second catalytic device reaches its activation temperature at an earlier stage, it is possible not only to detect a degree of deterioration in the adsorbing function of the first catalytic device, but also to oxidize hydrocarbons at an earlier stage of engine operation. Consequently, the purification of hydrocarbons can be achieved at an earlier stage of engine operation.

BRIEF DESCRIPTION OF THE DRAWINGS

The foregoing and further objects, features and advantages of the present invention will become apparent from the following description of preferred embodiments with reference to the accompanying drawings, wherein:

FIG. 7 is a sectional view of a portion of the catalyst deterioration detector according to another embodiment of the present invention.

DETAILED DESCRIPTION OF PREFERRED EMBODIMENTS

Figure 1:
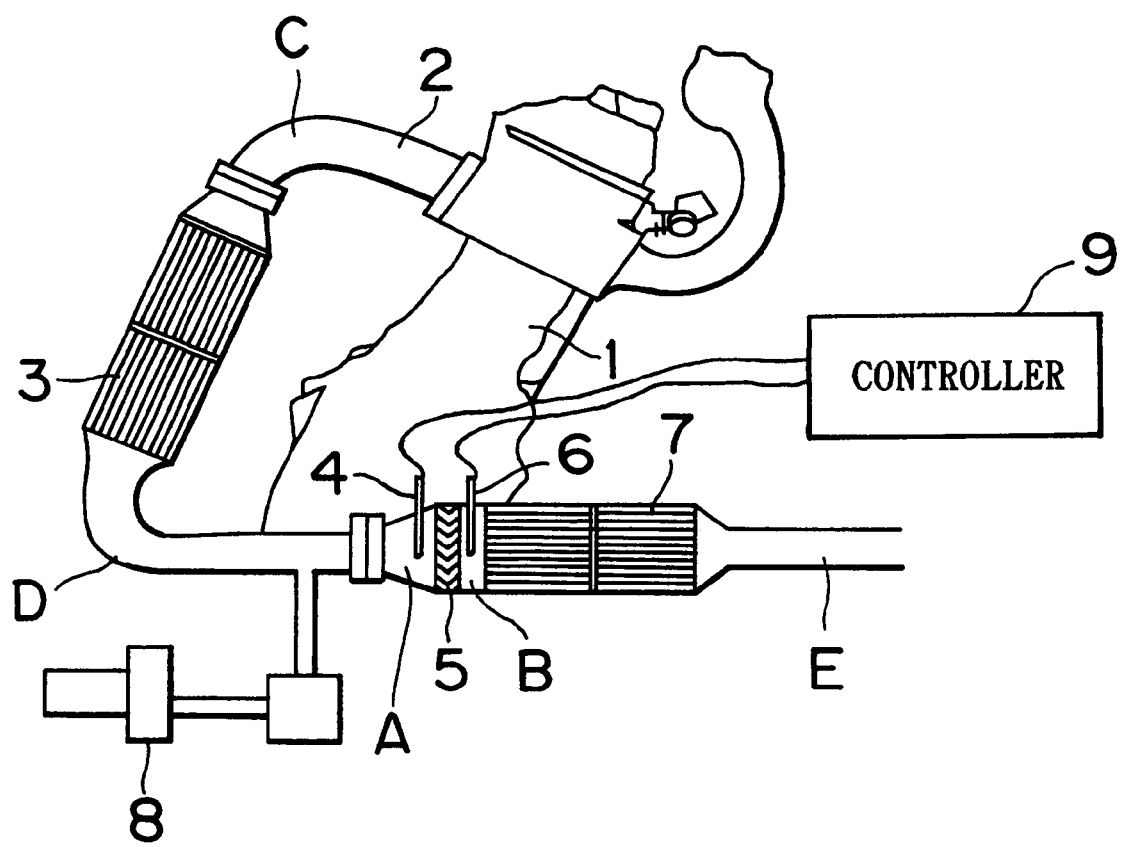
FIG. 1 is a side sectional view of a catalyst deterioration detector according to an embodiment of the present invention.

FIG. 1 shows an exhaust system that is provided with a catalyst deterioration detector according to one embodiment of the present invention. A catalytic device 3 (hereinafter referred to also as "the first catalytic device 3") is mounted to an exhaust pipe 2 which extends from an engine 1. In this embodiment, the deterioration in adsorbing function of the first catalytic device 3 is detected.

A three-way, first catalyst capable of simultaneously oxidizing HC and CO and reducing NOx is disposed in the first catalytic device 3. An exemplary three-way catalyst has an alumina surface on which noble metals such as platinum, rhodium and palladium are carried. Furthermore, the first catalytic device 3 has an alumina-coated surface in which pores are formed. These pores make it possible to adsorb noxious substances such as HC.

The first catalytic device 3 is disposed at such a location relative to the combustion chamber of the engine 1 that the temperature of exhaust gas discharged from the combustion chamber does not fall. In other words, the first catalytic device 3 is disposed at a location close to the combustion chamber of the engine 1, for instance, in an engine compartment. In general, the catalyst satisfactorily performs its oxidizing and reducing functions only after it has reached a relatively high temperature (activation temperature). Therefore, the first catalytic device 3 is installed in the vicinity of the combustion chamber. Thus, the exhaust gas raises the temperature of the first catalytic device 3, which reaches its activation temperature at an early stage of engine operation. Consequently, the first catalytic device 3 is capable of performing its oxidizing and reducing functions at an early stage of engine operation.

The first catalytic device 3 is provided at a location at which a plurality of exhaust pipes 2 extending from respective combustion chambers are connected together. For example, in the case where the engine 1 has six cylinders, the first catalytic device 3 is provided at a location where three exhaust pipes 2 are connected together. In total, three first catalytic devices 3 are provided at such locations. Alternatively, the first catalytic device 3 can be provided for each exhaust pipe 2. Alternatively, a single, first catalytic device 3 can be provided at a location where all the exhaust pipes 2 are connected together.

A temperature sensor 4 for detecting the temperature of the first catalytic device 3 is installed in the exhaust passage. The temperature sensor 4 can be operable to directly detect the temperature of the first catalytic device 3, or alternatively to indirectly detect the temperature of the first catalytic device 3 by detecting the temperature of the exhaust gas that has passed through the first catalytic device 3. In the illustrated embodiment, the temperature sensor 4 detects the temperature of the first catalytic device 3 at a location indicated by A in FIG. 1.

A hydrocarbon amount detector (hereinafter referred to also as the "HC detector"), which serves as an adsorption detector, is disposed in the exhaust passage downstream of the first catalytic device 3. The HC detector detects the degree of adsorption of the first catalytic device. The HC detector is a detection-oriented catalytic device. The HC detector comprises an electrically heated, second catalytic device 5 and a temperature sensor 6. The second catalytic device 5 is a heat-up type catalytic device, and the temperature sensor 6 serves as a temperature detector for detecting the temperature of the second catalytic device 5.

The second catalytic device 5 is operable to electrically generate heat. The temperature sensor 6 can directly detect the temperature of the second catalytic device 5, or can alternatively indirectly detect the temperature of the second catalytic device 5 by detecting the temperature of the exhaust gas that has just passed through the second catalytic device 5. In the illustrated embodiment, the temperature sensor 6 detects a temperature of the second catalytic device 5 at a location indicated by B in FIG. 1. The temperature sensors 4 and 6, which detect the temperatures of the first catalytic device 3 and the second catalytic device 5 respectively, are connected to a controller 9 such as an ECU (electronic control unit), which serves to determine the catalyst deterioration.

In some embodiments, the second catalytic device 5 does not itself generate heat. For example, second catalytic device 5 can also be heated up by a heater. The second catalytic device 5 includes a three-way, second catalyst that has oxidizing and reducing functions and also can purify exhaust gas. Furthermore, because the second catalytic device 5 is electrically heated up, it can reach its activation temperature at an earlier stage of engine operation and perform oxidizing and reducing functions. However, if the capacity of the second catalytic device 5 is too large, the amount of electric power consumption associated with the heat-up operation can become large.

Therefore, the capacity of the second catalytic device 5 is preferably limited to a certain level so that electric power consumption is at a satisfactory level. The second catalytic device 5 is typically disposed in an under-floor portion of the vehicle body.

In addition to detecting deterioration in the adsorbing function of the first catalytic device 3, the second catalytic device 5 also purifies noxious substances that are discharged upon starting of the engine. That is, immediately after starting the engine when it is still cold (cold start), the second catalytic device 5 is supplied with electricity and reaches its activation temperature at an earlier stage of engine operation. The second catalytic device 5 is heated up after being supplied with electricity for a certain length of time after the starting of the engine. Typically, the second catalytic device 5 is heated up until the first catalytic device 3 and a third catalytic device 7 described below reach their respective activation temperatures.

The third catalytic device 7 is disposed downstream of the second catalytic device 5. The third catalytic device 7 includes a third catalyst. The third catalytic device 7 is typically employed in modern vehicles equipped with gasoline engines and is typically located under the vehicle floor. The third catalytic device 7 has a sufficient capacity, such that once the third catalytic device 7 reaches its activation temperature, it can purify a substantial portion of the noxious substances contained in exhaust gas. However, the third catalytic device 7 is heated up by exhaust gas and is located far from the combustion chamber. For this reason, it can take a significant amount of time for the third catalytic device 7 to reach its activation temperature.

An electric air pump 8 is installed between the first catalytic device 3 and the second catalytic device 5, so as to deliver air into the exhaust passage. By delivering air into the exhaust passage, it is possible to promote an oxidizing reaction in the second catalytic device 5 and the third catalytic device 7, which are disposed downstream of the exhaust passage. A muffler (not shown) is disposed downstream of the third catalytic device 7. The purified exhaust gas is silenced and then discharged through the muffler into the atmosphere.

It will now be described briefly how the HC as unburnt fuel discharged from the engine 1 is purified in an exhaust system including the above-described catalyst deterioration detector. A process of detecting deterioration of the first catalytic device 3 using the catalytic deterioration detector of the present invention is also described below.

Figure 2:
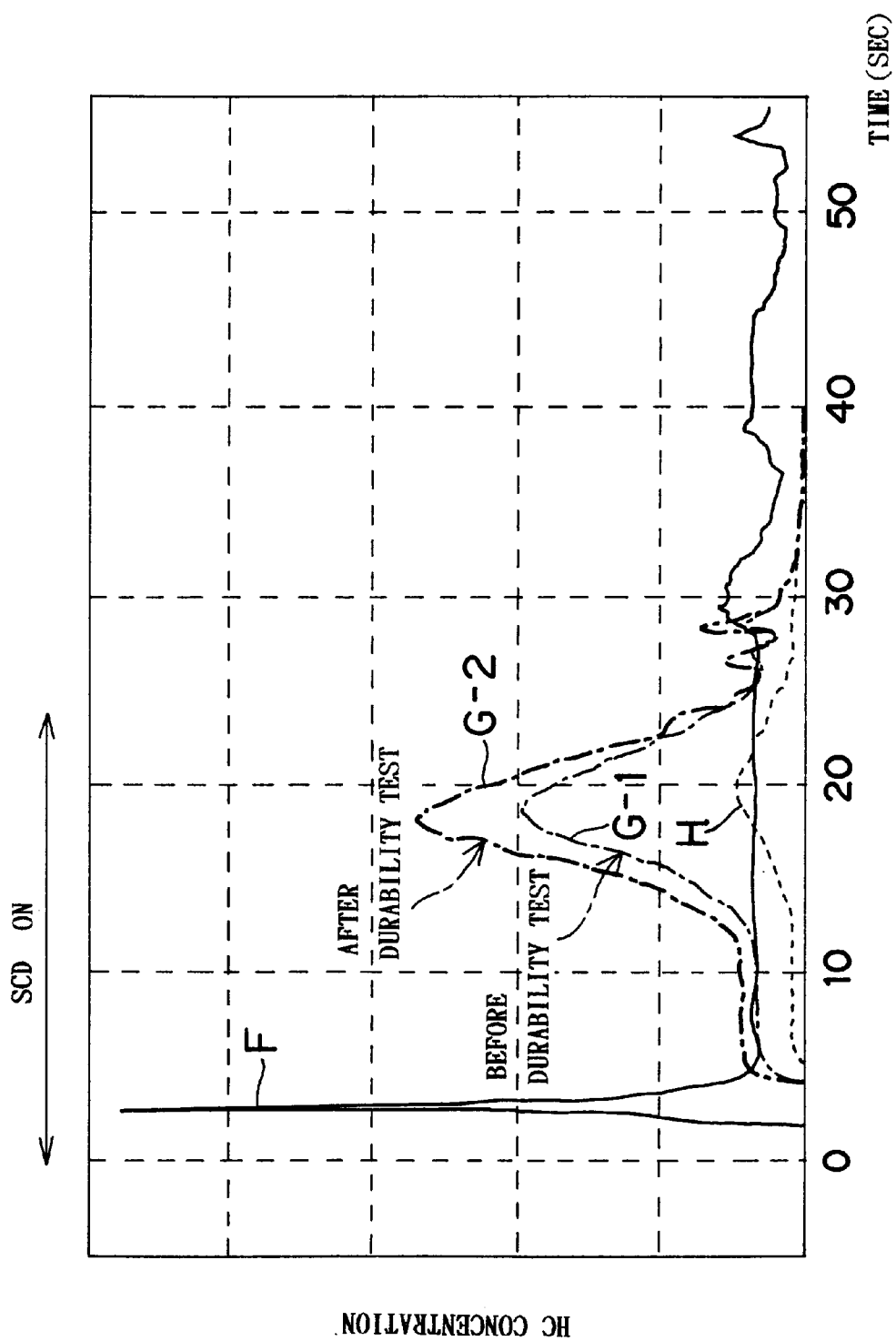
FIG. 2 is a graph showing the relationship between time and HC concentration at various locations in an exhaust passage.

FIG. 2 shows HC concentrations at locations indicated by C, D and E in FIG. 1, in conjunction with the lapse of time of engine operation. In this case, the engine 1 is started when it is still cold, that is, the engine 1 is cold started. The origin of the time axis represents the time when the engine 1 has just been started. As shown in an upper portion of the graph, the second catalytic device 5 is supplied with electricity for slightly more than twenty seconds (i.e., "SCD ON").

As is apparent from the peak F in the graph shown in FIG. 2, the amount of HC, which is the unburnt fuel discharged from the combustion chamber of the engine 1, is comparatively large immediately after starting the engine 1. Thereafter, the amount of HC is maintained at a substantially constant level. However, as described above, upon starting of the engine 1, the first catalytic device 3, the second catalytic device 5 and the third catalytic device 7 have not reached their activation temperatures yet. Therefore, it is impossible to sufficiently oxidize a large amount of HC that is discharged immediately after starting the engine 1. Upon starting of the engine 1, the second catalytic device 5 starts rising in temperature. However, a few seconds after the starting of the engine 1, the second catalytic device 5 is still significantly below its activation temperature.

Therefore, the first catalytic device 3 is used to temporarily adsorb a large amount of HC that is discharged immediately after starting the engine 1. While the first catalytic device 3 adsorbs HC, the second catalytic device 5 generates heat due to the supply of electricity and reaches its activation temperature rapidly, so that the HC can be oxidized by the second catalytic device 5.

The HC includes many substances such as methane or benzene. Many of these substances start gasifying below the activation temperature of the catalyst. If the first catalytic device 3 is at a relatively low temperature, the HC that has been adsorbed into the first catalytic device 3 remains in the first catalytic device. However, as the first catalytic device 3 rises in temperature, the HC actively gasifies and tends to be freed and discharged from the first catalytic device 3. The HC starts actively gasifying and being discharged when the first catalytic device 3 is below its activation temperature. The HC is discharged before being oxidized.

Referring to the graph in FIG. 2, peaks of curves G-1 and G-2 indicate that as a result of a rise in temperature of the first catalytic device 3, the HC adsorbed therein starts being discharged. That is, because the first catalytic device 3 temporarily adsorbs HC, there is generated a time difference typically of ten seconds or more between a peak of the curve F and the peaks of the curves G-1 and G-2. Also, the curves G-1 and G-2 have a gentle slope. Unless the first catalytic device 3 adsorbs the HC, the time difference between the peak of the curve F and the peaks of the curves G-1 and G-2 merely corresponds to a distance along the exhaust passage. In this case, there is no substantial difference in shape between the curve F and the curves G-1 and G-2. The HC that has been adsorbed into the first catalytic device 3 is partially oxidized therein and purified before being discharged.

The curve G-1 represents HC concentrations in a state where the first catalytic device 3 has not deteriorated, whereas the curve G-2 represents HC concentrations in a state where a durability test has been conducted to promote deterioration in adsorbing function of the first catalytic device 3. As can be understood from a comparison between the curves G-1 and G-2, the first catalytic device 3 whose adsorbing function has deteriorated as indicated by the curve G-2, discharges more HC at an earlier stage The HC discharged from the first catalytic device 3 is oxidized by the second catalytic device 5 and purified. At this time, the second catalytic device 5 has already reached its activation temperature by being electrically heated up. Therefore, even if the third catalytic device 7 does not completely perform its purifying function, most of the HC discharged from the engine 1 is still purified.

If the adsorbing function of the first catalytic device 3 further deteriorates, more HC is discharged to the downstream side at an earlier stage of engine operation. That is, HC is discharged before the second catalytic device 5 reaches its activation temperature, or an excessive amount of HC that is not oxidized by the second catalytic device 5 is discharged. As a result, some HC is discharged without being first purified. For this reason, it is advantageous to detect deterioration in the adsorbing function of the first catalytic device 3. However, as described below in detail, the second catalytic device 5 or the like detects deterioration in the adsorbing function of the first catalytic device 3.

Thereafter, due to a high temperature of the exhaust gas itself, the first catalytic device 3, which is preferably located close to the combustion chamber, first reaches its activation temperature. Subsequently, the third catalytic device 7 also reaches its activation temperature. After the lapse of typically about twenty seconds upon starting the engine 1, the supply of electricity to the second catalytic device 5 is stopped. By this time, at least the first catalytic device 3 has already reached its activation temperature.

By stopping the supply of electricity to the second catalytic device 5, any further electric power consumption by the second catalytic device 5 is prevented.

After each of the first catalytic device 3, the second catalytic device 5 and the third catalytic device 7 have reached their activation temperatures, they are each maintained at their respective activation temperatures due to the sufficiently high temperature of the exhaust gas.

After the first catalytic device 3, the second catalytic device 5 and the third catalytic device 7 have reached their activation temperatures, the process of purifying HC is performed stably. Thereafter, as is apparent from the curve H in FIG. 2, the HC concentration substantially becomes null. Further, as is also apparent from the curves G-1 and G-2 in FIG. 2, the first catalytic device 3 purifies most of the HC.

As described above, the adsorbing function of the first catalytic device 3 plays an important role in purifying HC immediately after the cold start operation of the engine. As described below, the HC detector (the adsorption degree detector) such as the second catalytic device 5 detects deterioration in adsorbing function of the first catalytic device 3.

Figure 3:
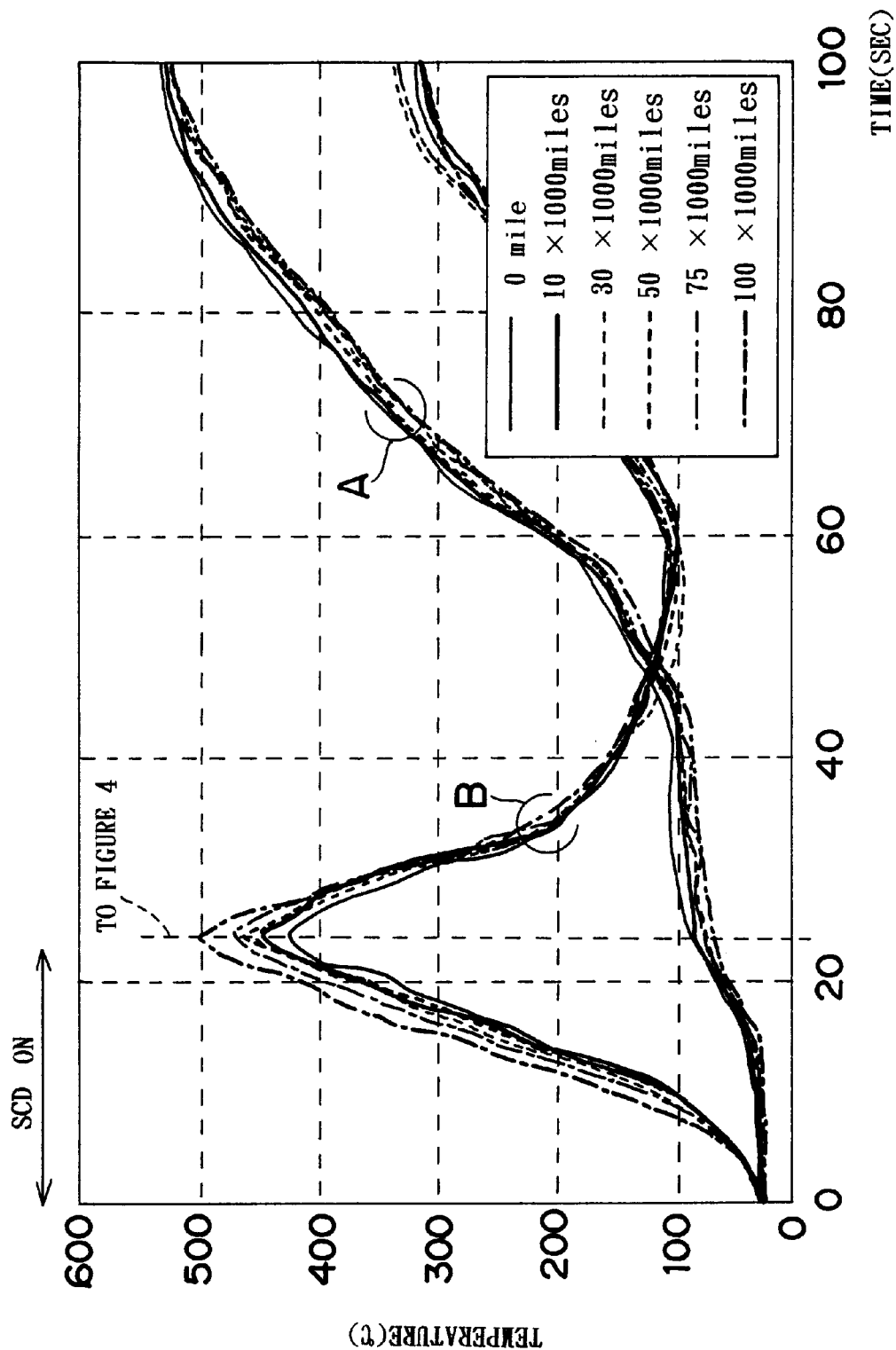
FIG. 3 is a graph showing the relationship between time and temperature across a detection-oriented catalytic device.

FIG. 3 shows temperatures at the locations A and B in FIG. 1, in conjunction with the lapse of time. The location A is downstream of the first catalytic device 3 and serves to detect a temperature of the first catalytic device 3. The location B is downstream of the second catalytic device 5 and serves to detect a temperature of the second catalytic device 5. Further, a durability test wherein the vehicle covers various distances ranging from 0 to 100 (×1000 miles) was conducted as shown in curve G-2 of FIG.2 so as to change the degree of deterioration of the first catalytic device 3. After the durability test, the temperatures at the locations A and B were measured.

The temperature at the location A indicated by the graph in FIG. 3 gradually rises with the lapse of time after starting the engine 1. This is because the first catalytic device 3 is gradually heated up due to the temperature of the exhaust gas that is discharged from the combustion chamber of the engine 1. Furthermore, but to a limited extent, oxidizing and reducing reactions occur in the first catalytic device 3 before it reaches its activation temperature. While these reactions occur, heat is generated. As the first catalytic device 3 further deteriorates (with respect to not only the adsorbing function, but also the oxidizing and reducing functions), the oxidizing and reducing reactions become less likely to occur. For this reason, if the first catalytic device 3 further deteriorates, the amount of reaction heat generated in the first catalytic device 3 decreases. As the first catalytic device 3 deteriorates, the temperature at the location A falls.

On the other hand, because the second catalytic device 5 is caused to generate heat immediately after starting the engine 1, the temperature of the location B shown in FIG. 3 rises smoothly upon starting of the engine 1. The temperature at the location B gently falls as shown in the graph after the second catalytic device 5 has stopped generating heat after the lapse of a certain period of time. Thereafter, with the lapse of time, the temperature at the location B gradually rises again due to the temperature of the exhaust gas that is discharged from the combustion chamber of the engine 1.

The second catalytic device 5 oxidizes and reduces the HC that has been discharged from the first catalytic device 3, which is located on the upstream side of the second catalytic device 5. In this process, the second catalytic device 5 also generates heat. As the first catalytic device 3 deteriorates (with respect to the adsorbing function and also the oxidizing and reducing functions), more HC is discharged to the downstream side. Hence, the oxidizing and reducing reactions become more active. For this reason, if the first catalytic device 3 further deteriorates, the amount of reaction heat generated in the second catalytic device 5 increases. As the first catalytic device 3 deteriorates, the temperature at the location B rises.

In this embodiment, deterioration of the first catalytic device 3 is detected using a difference in temperature between the locations A and B. The difference in temperature between the locations A and B varies depending on the degree of deterioration in the adsorbing function of the first catalytic device 3. This process of detection utilizes a difference in temperature between the locations A and B when the first catalytic device 3 has not been sufficiently heated up and when the second catalytic device 5 has been forcibly caused (electrically heated) to generate heat and has reached its highest temperature.

When the first catalytic device 3 has not been sufficiently heated up, it performs the adsorbing function remarkably. Therefore, the process of detection utilizes temperatures when the first catalytic device 3 has not been sufficiently heated up. Further, when the second catalytic device 5 reaches its highest temperature, the difference in temperature between the locations A and B reaches its maximum, and fluctuations of the difference in temperature between the locations A and B can be detected most easily. Therefore, the process of detection utilizes temperatures when the second catalytic device 5 reaches its highest temperature. By utilizing the difference in temperature between the locations A and B, neither fluctuations of the temperature at the location A, nor fluctuations of the temperature at the location B, have a significant effect on the result of detection.

Figure 4:
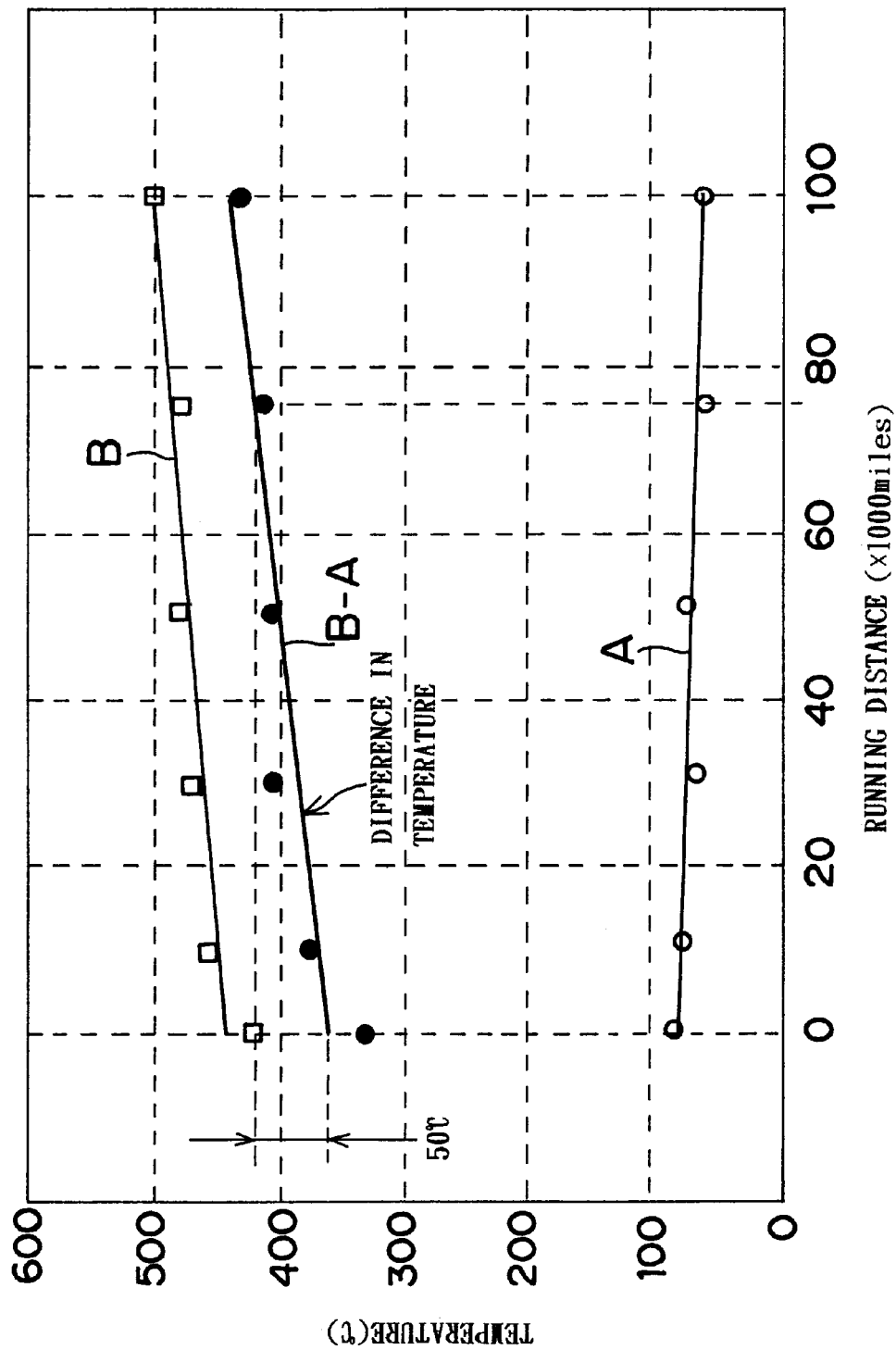
FIG. 4 is a graph showing the relationship between time and temperature across the detection-oriented catalytic device for various running distances (degrees of deterioration)

FIG. 4 shows temperatures at the locations A and B and the differences in temperature when the first catalytic device 3 has not been sufficiently heated up and the second catalytic device 5 has reached its highest temperature by being forcibly caused to generate heat. Referring to the graph shown in FIG. 4, the axis of the abscissa represents distance covered by the vehicle, that is, degree of deterioration of the first catalytic device 3, and the axis of the ordinate represents temperature. As described above, as the first catalytic device 3 deteriorates, the temperature at the location A falls. Conversely, as the first catalytic device 3 deteriorates, the temperature at the location B rises. Consequently, the difference in temperature, which is obtained by subtracting the temperature at the location A from the temperature at the location B, gradually increases as the first catalytic device 3 deteriorates.

That is, as the first catalytic device 3 deteriorates, the difference in temperature between the locations A and B increases. If the correlation between the deterioration of the first catalytic device 3 and the difference in temperature between the locations A and B is preliminarily determined, it is possible to detect deterioration in the adsorbing function of the first catalytic device 3 based on a difference in temperature between the locations A and B. In this embodiment, if the difference in temperature between the locations A and B has increased by 50° C. from an initial value (of difference in temperature), it is determined that the adsorbing function of the first catalytic device 3 has deteriorated.

It will be understood by those skilled in the art, that the difference in temperature (with respect to an initial value) that is considered to determine that the adsorbing function of the first catalytic device has deteriorated can be selected as some value other than 50° C., based, for example, on an acceptable level of deterioration.

Figure 5:
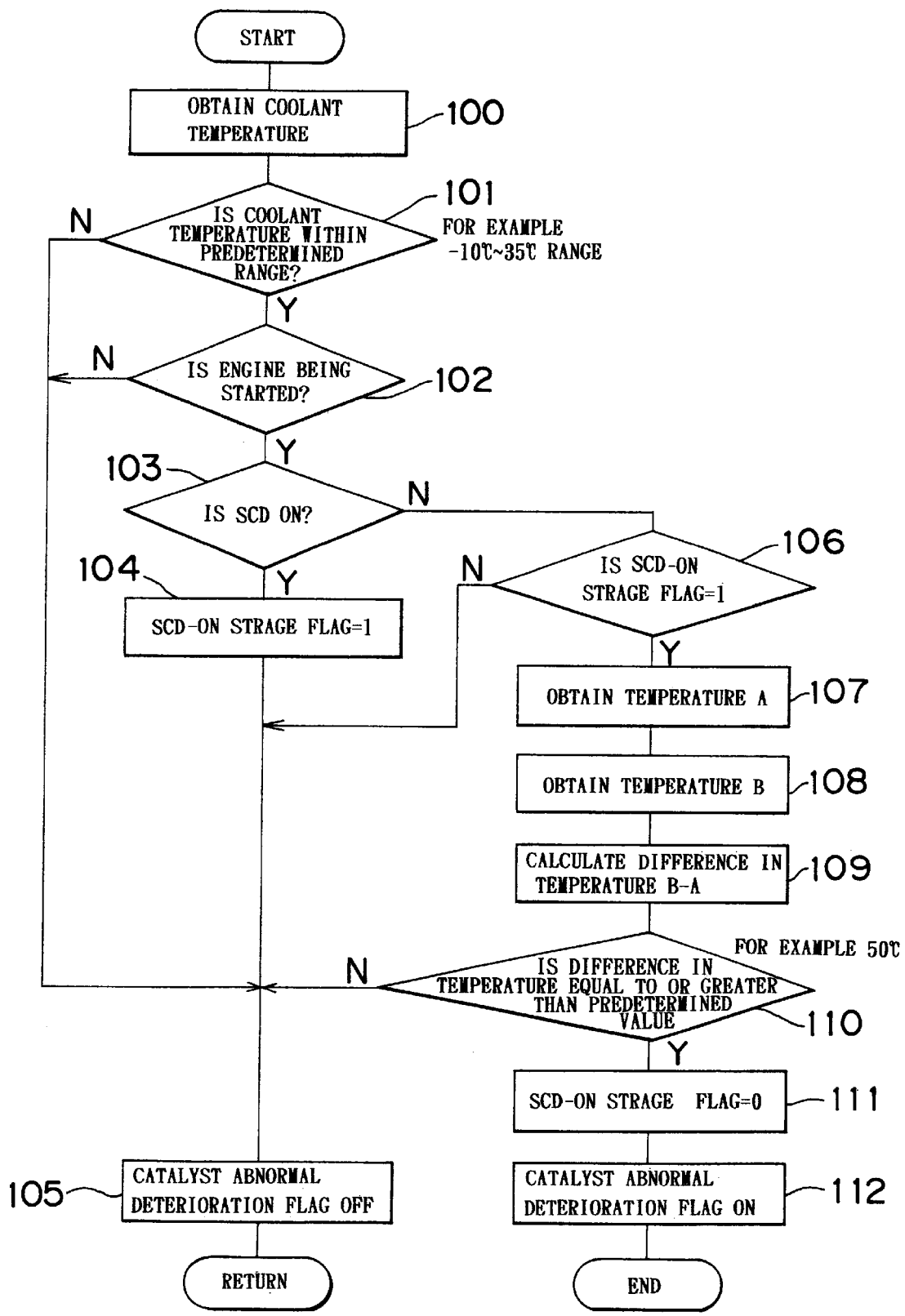
FIG. 5 is a flowchart of an exemplary embodiment of a control routine for detecting deterioration in the catalyst deterioration detector shown in FIG. 1.
Figure 6:
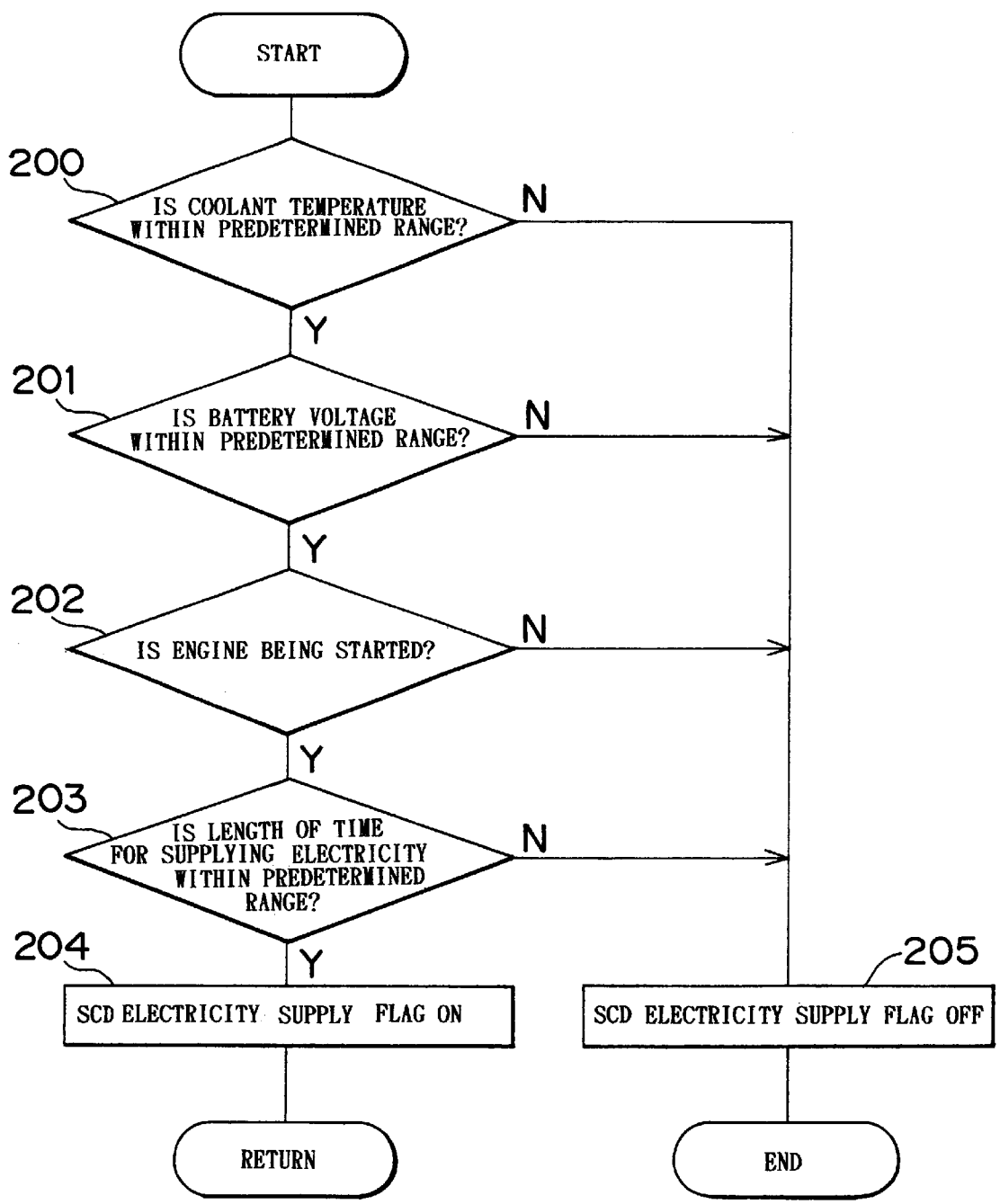
FIG. 6 is a flowchart of an exemplary embodiment of a control routine for detecting a state of supply of electricity to the detection-oriented catalytic device in the catalyst deterioration detector shown in FIG. 1.

With reference to the flowcharts shown in FIGS. 5 and 6, exemplary embodiments of controlling detection of deterioration in the adsorbing function of the first catalytic device 3 will be described.

First, the temperature of a coolant for the engine 1 is determined using an installed sensor (step 100). It is then determined whether or not the thus-obtained coolant temperature is within a predetermined range (step 101). For example, the predetermined range of the coolant temperature can range from −10° C. to 35° C. If the coolant temperature is within this range, the cold start operation of the engine has been performed. As described above, the first catalytic device 3 remarkably performs its adsorbing function at a relatively low temperature. Also, if the first catalytic device 3 has already reached its activation temperature, HC is immediately oxidized. Therefore, except when the cold start operation is performed, it is not possible to precisely detect deterioration in the adsorbing function of the first catalytic device 3. For this reason, it is determined in step 101 whether or not the cold start operation is performed.

If it is determined in step 101 that the coolant temperature is not within the predetermined range (that is, the result in step 101 is negative), the warm start operation is performed instead of the cold start operation, or the first catalytic device 3 has been sufficiently heated up after starting the engine 1. Thus, a catalyst abnormal deterioration flag is turned off (step 105). When the process passes through step 105, the steps starting from step 100 are repeated after the lapse of a predetermined length of time. In the case where the first catalytic device 3 has not been sufficiently heated up, at the time of the next cold start operation, it is again determined whether or not the first catalytic device 3 has deteriorated in adsorbing function.

On the other hand, if it is determined in step 101 that the coolant temperature is within the predetermined range (that is, the result in step 101 is affirmative), the cold start operation of the engine 1 has been performed, and the first catalytic device 3 still performs its adsorbing function remarkably. Therefore, it is determined whether or not the engine 1 has already been started (step 102). In the case where the engine 1 cannot be started, it is impossible to precisely detect deterioration of the first catalytic device 3. Therefore, if the result in step 102 is negative, the catalyst abnormal deterioration flag is turned off in step 105.

If it is determined in step 102 that the engine 1 has already been started (that is, the result in step 102 is affirmative), it is then determined whether or not the second catalytic device 5 is supplied with electricity (step 103). The control routine shown in FIG. 6 is used in step 103 to determine whether or not the second catalytic device 5 is supplied with electricity. If an electricity supply flag for the second catalytic device 5 has been turned on, it can be determined that the second catalytic device 5 is supplied with electricity. On the contrary, if the electricity supply flag for the second catalytic device 5 has been turned off, it can be determined that the second catalytic device 5 is not supplied with electricity. The control routine shown in FIG. 6 will be described below.

Immediately after starting the engine 1, the second catalytic device 5 is supplied with electricity. Therefore, the result in step 103 is affirmative, and an SCD-ON storage flag is set to 1 (step 104). As described above, the process of detection utilizes a difference in temperature between the locations A and B when the supply of electricity to the second catalytic device 5 has been terminated. Hence, the SCD-ON storage flag is used to measure a timing at which the supply of electricity to the second catalytic device 5 is terminated. Following step 104, the catalyst abnormal deterioration flag is turned off in step 105. The steps starting from step 100 are repeated at intervals of a predetermined length of time.

Meanwhile, if the supply of electricity to the second catalytic device 5 is suspended after the lapse of about twenty seconds upon starting of the engine 1, the result in step 103 becomes negative. If the result in step 103 is negative, it is determined whether or not the SCD-ON storage flag has been set to 1 (step 106).

If the SCD-ON storage flag has been determined to be set to 1 in step 106 (that is, the result in step 106 is affirmative), the supply of electricity to the second catalytic device 5 has just been terminated. The temperatures at the locations A and B are obtained from the temperature sensors 4 and 6 (steps 107 and 108). The difference in temperature is calculated by the controller 9, which is connected to the temperature sensors 4 and 6 (step 109).

Following step 109, it is determined by the controller 9 whether or not the difference in temperature between the locations A and B is equal to or greater than a predetermined value (as described above, for example, +50° C. with respect to an initial value) (step 110). If the difference in temperature between the locations A and B is equal to or greater than the predetermined value (that is, the result in step 110 is affirmative) the SCD-ON storage flag is set to 0 (step 111), and the catalyst abnormal deterioration flag is then turned on (step 112). The state where the catalyst abnormal deterioration flag has been turned on indicates that the degree of deterioration of the adsorbing function of the first catalytic device 3 is outside of a permissible range.

If the difference in temperature between the locations A and B is smaller than the predetermined value in step 110 (that is, the result in step 110 is affirmative), it is determined that the first catalytic device 3 has not deteriorated by greater than an acceptable amount. Therefore, the catalyst abnormal deterioration flag is turned off in step 205.

The exemplary control routine shown in FIG. 6 will now be described. First, as soon as the ignition switch is turned on, it is determined whether or not the coolant temperature is within a predetermined range (step 200). The step 200 is substantially similar to the aforementioned step 100. For example, the predetermined range of the coolant temperature can range from about −10° C. to about 35° C. If the coolant temperature is within this range, the cold start operation of the engine 1 has been performed. If it is determined in step 200 that the coolant temperature is not within the predetermined range (that is, the result in step 200 is negative), the warm start operation has been performed, or the second catalytic device 5 has been sufficiently heated up after starting the engine 1. Therefore, there is no need to cause the second catalytic device 5 to generate heat, and the electricity supply flag for the second catalytic device (SCD) is turned off (step 205).

On the other hand, if it is determined in step 200 that the coolant temperature is within the predetermined range (that is, the result in step 200 is affirmative), it is determined whether or not the battery voltage is within a predetermined range (step 201). The second catalytic device 5 is caused to generate heat due to electric power supplied by the battery. Accordingly, if the second catalytic device 5 is caused to generate heat when the battery voltage is low, the engine 1 may not be started properly. Thus, the second catalytic device 5 is supplied with electricity only when a certain level of voltage is applied to the battery.

If the battery voltage is outside of the predetermined range in step 201, that is, if the battery voltage is low, the electricity supply flag for the second catalytic device (SCD) is turned off in step 205, so that the second catalytic device 5 is not supplied with electricity. Conversely, if the battery voltage is within the predetermined range, it is determined whether or not the engine 1 has already been started (step 202). In the case where the engine 1 cannot be started, the catalyst abnormal deterioration flag is turned off in step 205.

If it is determined in step 202 that the engine 1 has already been started, that is, if the result in step 202 is affirmative, it is determined whether or not the length of time for supplying electricity to the second catalytic device 5 is within a predetermined range (step 203). If the length of time for supplying electricity to the second catalytic device 5 is within the predetermined range, the electricity supply flag for the second catalytic device (SCD) is turned on (step 204), so that the second catalytic device 5 is supplied with electricity. The second catalytic device 5 generates heat after being supplied with electricity. Then, after the lapse of a predetermined length of time, the steps starting from step 200 are repeated.

While the steps starting from step 200 are repeated, the predetermined length of time for supplying electricity to the second catalytic device 5 elapses, and the result in step 203 becomes negative. If the result in step 203 becomes negative, the electricity supply flag for the second catalytic device (SCD) is turned off in step 205, whereby the second catalytic device 5 is stopped from being supplied with electricity. Based on the thus-determined electricity supply flag for the second catalytic device (SCD), the determination in step 103 is made.

In the aforementioned embodiment, the amount of HC is detected from a difference in temperature across the second catalytic device 5. If the difference in temperature exceeds a predetermined criterion value, it is determined that the adsorbing function of the first catalytic device 3 has deteriorated.

However, it is also possible to detect an amount of HC in the exhaust gas using other embodiments of the present invention. For example, a temperature sensor can be disposed within the body of the second catalytic device 5 (the detection-oriented catalytic device) or downstream of the second catalytic device 5, so that the amount of HC can be detected based merely on a peak value of the temperature sensor, which is obtained upon termination of the supply of electricity to the second catalytic device 5. As described above, the temperature detected by the temperature sensor rises as the adsorbing function of the first catalytic device 3 deteriorates. Thus, if the detected temperature exceeds the predetermined criterion value, it can be determined that the adsorbing function of the first catalytic device 3 has deteriorated.

Alternatively, a temperature sensor can be disposed within the body of the second catalytic device 5 or downstream of the second catalytic device 5, so that the cumulative temperature can be calculated by summing temperatures during supply of electricity to the second catalytic device 5. The cumulative temperature is used to detect an amount of HC in the exhaust gas. As in the above-described case, the increase rate of cumulative temperature rises as the adsorbing function of the first catalytic device 3 deteriorates. Thus, if the increase rate of cumulative temperature exceeds the predetermined criterion value, it can be determined that the adsorbing function of the first catalytic device 3 has deteriorated.

Alternatively, an HC sensor can be disposed between the first catalytic device 3 and the second catalytic device 5, so that the amount of HC discharged from the first catalytic device 3 can be directly detected.

In the above-described embodiment, the second catalytic device 5, which serves as a detection-oriented catalytic device, performs not only the function of detecting an amount of HC discharged from the first catalytic device 3, but also performs the function of oxidizing and reducing noxious substances contained in the exhaust gas so as to purify the noxious substances.

However, the second catalytic device 5 can be used simply to detect an amount of HC discharged from the first catalytic device 3. In such embodiments, the HC detector, which comprises the detection-oriented catalytic device and the temperature detector, can be constructed as shown in FIG. 7. In the HC detector shown in FIG. 7, a second catalytic device 40 serving as a detection-oriented catalytic device can be constructed of the same material as the second catalytic device 5 shown in FIG. 1. The second catalytic device 40 is disposed so as to oxidize HC contained in exhaust gas flowing from the upstream side. However, the second catalytic device 40 is sized so as not to fill an entire cross section of the exhaust passage. Furthermore, a temperature sensor 50 for detecting a temperature of the second catalytic device 40 is installed near to the downstream side of the second catalytic device 40. This embodiment of the HC detector also makes it possible to detect deterioration in the adsorbing function of the first catalytic device 3, as in the embodiment of the HC detector shown in FIG. 1. Furthermore, it is possible to detect deterioration in the adsorbing function of the first catalytic device 3 based on only a peak value of the temperature sensed by the sensor 50.

In alternative embodiments, while the second catalytic device 5 is supplied with electricity, the terminal voltage (or current) of the second catalytic device 5 can be detected so as to detect deterioration in the adsorbing function of the first catalytic device 3 based on the detected terminal voltage (or current). In the case where the second catalytic device 5 is caused to generate heat by being supplied with electricity, the resistance value of the second catalytic device 5 changes depending on the temperature of the second catalytic device 5. Therefore, the temperature of the second catalytic device 5 can be calculated from a terminal voltage, which is calculated from a resistance value of the second catalytic device 5. Provided that the temperature of the second catalytic device 5 can be calculated, it is possible to detect deterioration in the adsorbing function of the first catalytic device 3, just as in the above-described embodiments.

In the above-described embodiments, the HC detector that detects an amount of HC downstream of the first catalytic device 3 is employed as an adsorption degree detector that detects a degree of adsorption of the first catalytic device 3. However, the degree of adsorption of the first catalytic device 3 can be detected using other embodiments of the present invention.

The catalyst deterioration detector of the present invention is not limited to the above-described embodiments. For example, in the above-described embodiments, the first catalytic device 3, the second catalytic device 5 and the third catalytic device 7 employ a three-way catalyst that has an alumina carrier on which platinum, rhodium and palladium are carried. However, the carrier of the three-way catalyst can optionally include, for example, only one noble metal, or combinations of two noble metals such as platinum and rhodium. Further, although a three-way catalyst is preferably employed, an ordinary oxidation catalyst may also be used in the present invention.

In the above described embodiments, the controller 9 is implemented as a programmed general purpose computer. It will be appreciated by those skilled in the art that the controller 9 can be implemented using a single special purpose integrated circuit (e.g., ASIC) having a main or central processor section for overall, system-level control, and separate sections dedicated to performing various different specific computations, functions and other processes under control of the central processor section. The controller 9 also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller 9 can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the programs shown in FIGS. 5 and 6 can be used as the controller. A distributed processing architecture can be used for maximum data/signal processing capability and speed.

While the present invention has been described with reference to what are presently considered to be preferred embodiments thereof, it is to be understood that the present invention is not limited to the disclosed embodiments or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A catalyst deterioration detector for determining deterioration of a first catalytic device that is disposed in an exhaust passage of an internal combustion engine, the first catalytic device adsorbs hydrocarbons and oxidizes the hydrocarbons at a temperature equal to or higher than an activation temperature of the first catalytic device, the catalyst deterioration detector comprising:
    an adsorption detector that detects a degree of adsorption of hydrocarbons by the first catalytic device;
    a controller that determines the deterioration of the first catalytic device based on the degree of adsorption of hydrocarbons detected by the adsorption detector,
    wherein the adsorption detector is disposed in the exhaust passage downstream of the first catalytic device, and the adsorption detector detects an amount of hydrocarbons discharged from the first catalytic device,
    wherein the adsorption detector includes a second catalytic device that oxidizes hydrocarbons and a first temperature detector that detects a temperature of the second catalytic device,
    wherein the second catalytic device is electrically actuated to generate heat or to heat up; and
    a second temperature detector that detects the temperature of the first catalytic device, and the second temperature detector and the first temperature detector are respectively disposed upstream and downstream of the second catalytic device.

2. The catalyst deterioration detector according to claim 1, wherein the controller determines the deterioration of the first catalytic device by comparing temperatures detected by the second temperature detector and the first temperature detector.

3. The catalyst deterioration detector according to claim 2, wherein:
    when the temperature downstream of the second catalytic device detected by the first temperature detector is higher than the temperature upstream of the second catalytic device detected by the second temperature detector, the controller determines that the first catalytic device has deteriorated.

4. The catalyst deterioration detector according to claim 1, wherein the temperatures upstream and downstream of the second catalytic device are detected by the second temperature detector and the first temperature detector, respectively, in a state in which the first catalytic device has not been warmed up and in which the second catalytic device has been heated up.

5. A catalyst deterioration detector for determining deterioration of a first catalytic device that is disposed in an exhaust passage of an internal combustion engine, the first catalytic device adsorbs hydrocarbons and oxidizes the hydrocarbons at a temperature equal to or higher than an activation temperature of the first catalytic device, the catalyst deterioration detector comprising:
    an adsorption detector that detects a degree of adsorption of hydrocarbons by the first catalytic device; and
    a controller that determines the deterioration of the first catalytic device based on the degree of adsorption of hydrocarbons detected by the adsorption detector,
    wherein the adsorption detector is disposed in the exhaust passage downstream of the first catalytic device, and the adsorption detector detects an amount of hydrocarbons discharged from the first catalytic device,
    wherein the adsorption detector includes a second catalytic device that oxidizes hydrocarbons and a first temperature detector that detects a temperature of the second catalytic device,
    wherein the second catalytic device is electrically actuated to generate heat or to heat up; and
    the first temperature detector detects a temperature of the second catalytic device, which has been heated up, and
    wherein when the temperature detected by the first temperature detector exceeds a predetermined value, the controller determines that the first catalytic device has deteriorated.

6. A catalyst deterioration detector for determining deterioration of a first catalytic device that is disposed in an exhaust passage of an internal combustion engine, the first catalytic device adsorbs hydrocarbons and oxidizes the hydrocarbons at a temperature equal to or higher than an activation temperature of the first catalytic device, the catalyst deterioration detector comprising:
    an adsorption detector that detects a degree of adsorption of hydrocarbons by the first catalytic device; and
    a controller that determines the deterioration of the first catalytic device based on the degree of adsorption of hydrocarbons detected by the adsorption detector,
    wherein the adsorption detector is disposed in the exhaust passage downstream of the first catalytic device, and the adsorption detector detects an amount of hydrocarbons discharged from the first catalytic device,
    wherein the adsorption detector includes a second catalytic device that oxidizes hydrocarbons and a first temperature detector that detects a temperature of the second catalytic device,
    wherein the second catalytic device is electrically actuated to generate heat or to heat up; and
    a second temperature detector detects a temperature of the first catalytic device while the second catalytic device is heated up, and
    wherein when a value of the temperature detected by the first temperature detector exceeds a predetermined value, the controller determines that the first catalytic device has deteriorated.

7. A method of detecting deterioration of a catalyst of a first catalytic device disposed in an exhaust passage of an internal combustion engine, the first catalytic device adsorbs hydrocarbons and oxidizes the hydrocarbons at a temperature equal to or higher than an activation temperature of the first catalytic device, the method comprising:

detecting a degree of adsorption of hydrocarbons in an exhaust gas by the first catalytic device; and determining the deterioration of the first catalytic device based on the detected degree of adsorption of the hydrocarbons by the first catalytic device, wherein the degree of adsorption of the hydrocarbons is determined by detecting an amount of hydrocarbons discharged from the first catalytic device in the exhaust passage, and wherein the amount of hydrocarbons discharged by the first catalytic device is determined by detecting a temperature of a second catalytic device disposed downstream of the first catalytic device in the exhaust passage.

8. The method according to claim 7, comprising detecting temperatures in the exhaust passage upstream and downstream of the second catalytic device.

9. The method according to claim 8, wherein the deterioration of the first catalytic device is determined by comparing the temperatures detected in the exhaust passage upstream and downstream of the second catalytic device.

10. The method according to claim 9, wherein the first catalytic device is determined to be deteriorated when the temperature in the exhaust passage downstream of the second catalytic device becomes higher than the temperature in the exhaust passage upstream of the second catalytic device by at least a selected value.

11. The method according to claim 8, wherein the temperatures in the exhaust passage upstream and downstream of the second catalytic device are detected in a state in which the first catalytic device is not warmed up and in which the second catalytic device is heated up.

12. A catalyst deterioration detector for determining deterioration of a first catalytic device that is disposed in an exhaust passage of an internal combustion engine, the first catalytic device adsorbs hydrocarbons and oxidizes the hydrocarbons at a temperature equal to or higher than an activation temperature of the first catalytic device, the catalyst deterioration detector comprising:

an adsorption detector that detects a degree of adsorption of hydrocarbons by the first catalytic device, the adsorption detector including:

a second catalytic device that oxidizes hydrocarbons;

a first temperature detector downstream of the second catalytic device, the first temperature detector detects the temperature of the second catalytic device; and a second temperature detector upstream of the second catalytic device, the second temperature detector detects the temperature of the first catalytic device; and a controller that determines the deterioration of the first catalytic device based on the degree of adsorption detected by the adsorption detector, the first catalytic device is determined to be deteriorated when the temperature in the exhaust passage downstream of the second catalytic device becomes higher than the temperature in the exhaust passage upstream of the second catalytic device by at least a selected value.

\* \* \* \* \*